United States Patent [19]
Brock et al.

[11] 3,858,715
[45] Jan. 7, 1975

[54] SHACKLE CLEANING DEVICE

[76] Inventors: Bob J. Brock, 2909 Laramie Cir.;
Othel E. Anderson, Rt. 4, both of Hattiesburg, Miss. 39401

[22] Filed: Apr. 5, 1973

[21] Appl. No.: 348,464

[52] U.S. Cl. ............................... 198/229, 15/21 D
[51] Int. Cl. ...................... B65g 45/00, A46b 13/02
[58] Field of Search ...... 15/21 R, 21 C, 21 D, 21 E, 15/88, 97, 104.2; 198/229

[56] References Cited
UNITED STATES PATENTS

| | | | |
|---|---|---|---|
| 1,111,752 | 9/1914 | Lichtenstein | 198/229 |
| 2,439,305 | 4/1948 | Johnson | 15/77 |
| 2,891,268 | 6/1959 | Cheadle | 15/104.2 |
| 3,284,828 | 11/1966 | Jennings et al. | 15/21 D |

Primary Examiner—Edward L. Roberts
Attorney, Agent, or Firm—A. Yates Dowell, Jr.

[57] ABSTRACT

An apparatus for cleaning shackles and other elements suspended from an overhead conveyor and having a plurality of rotary driven brushes selectively mounted adjacent to the conveyor and which are remotely driven from a portable support, power, and control unit.

8 Claims, 7 Drawing Figures

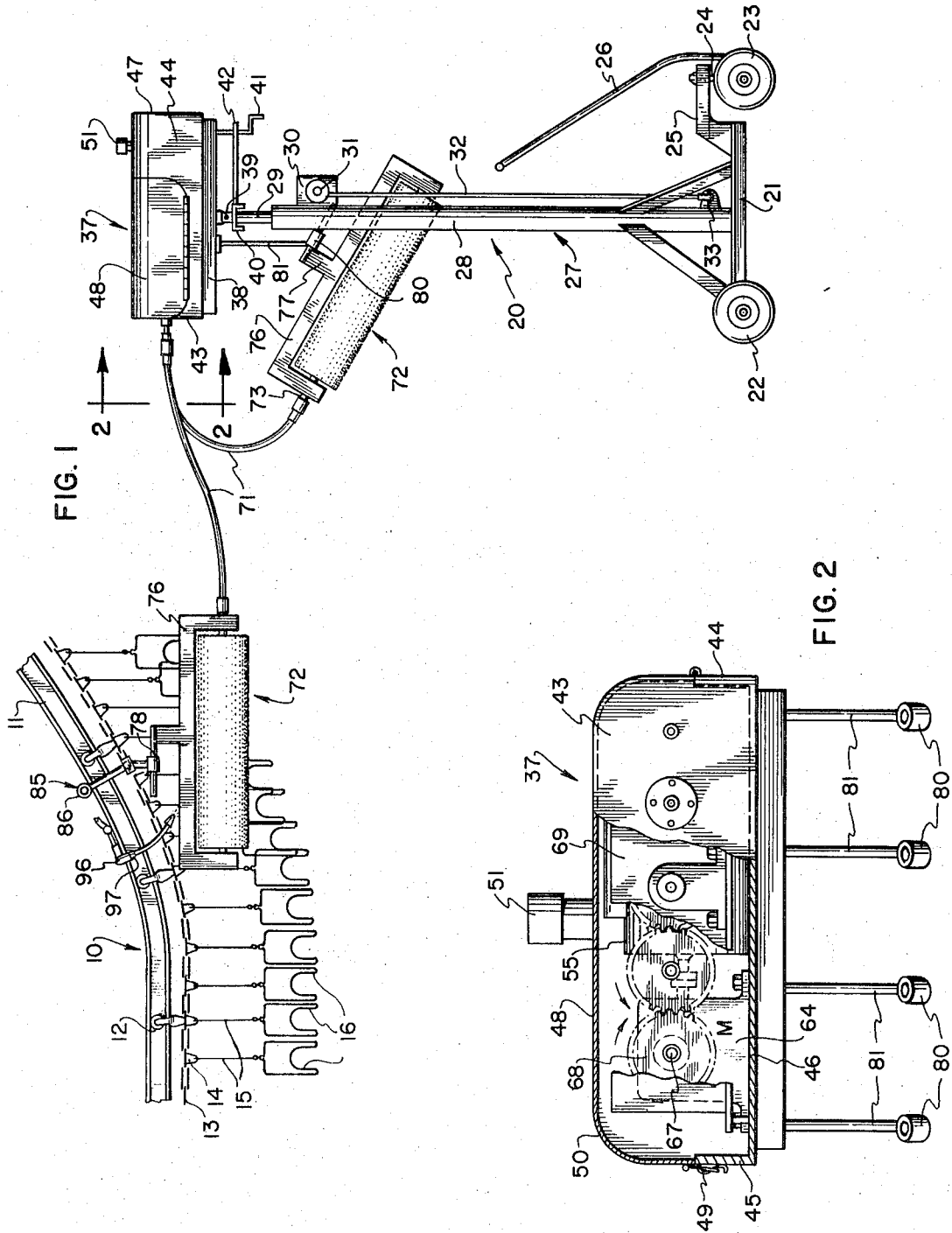

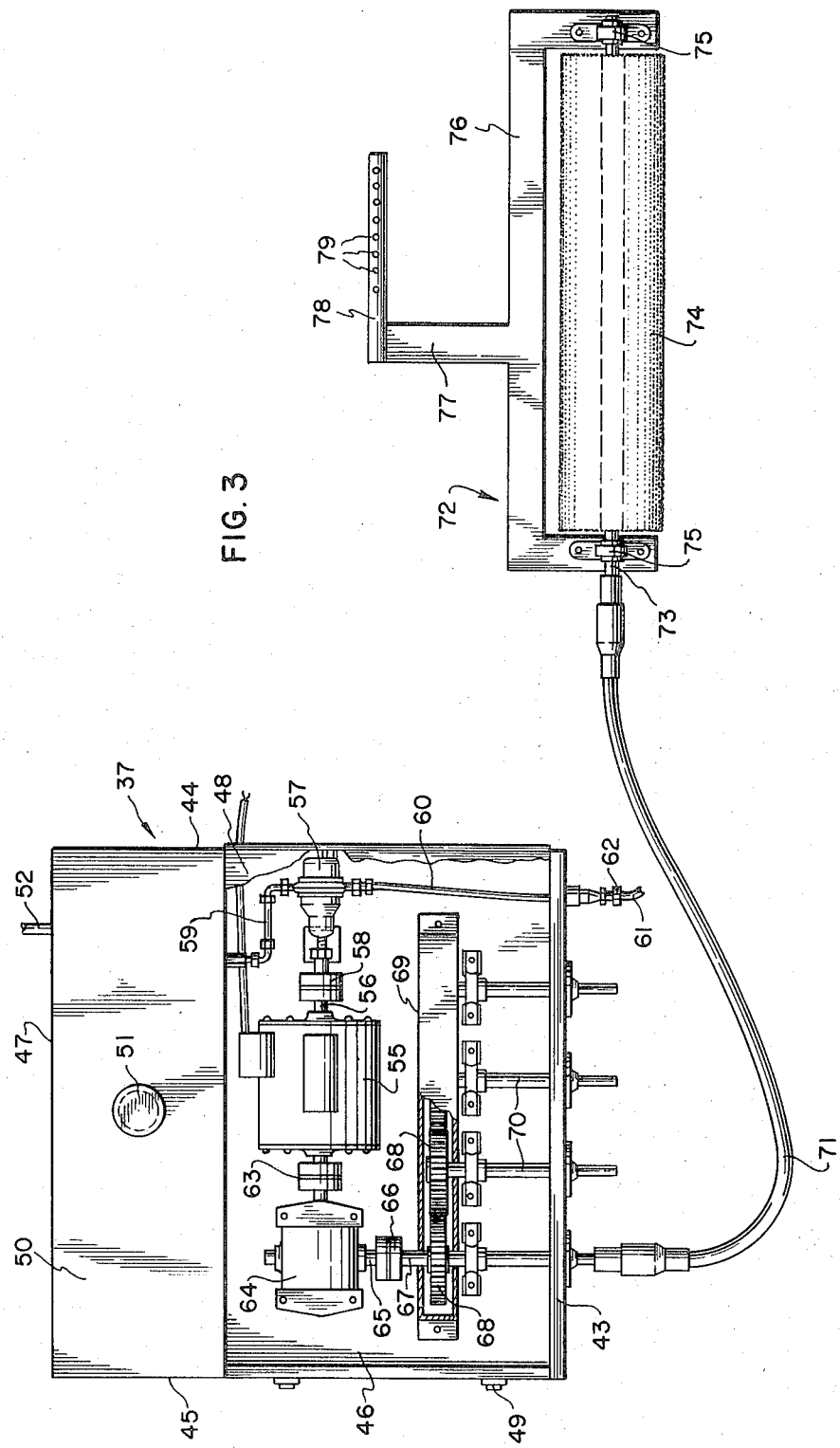

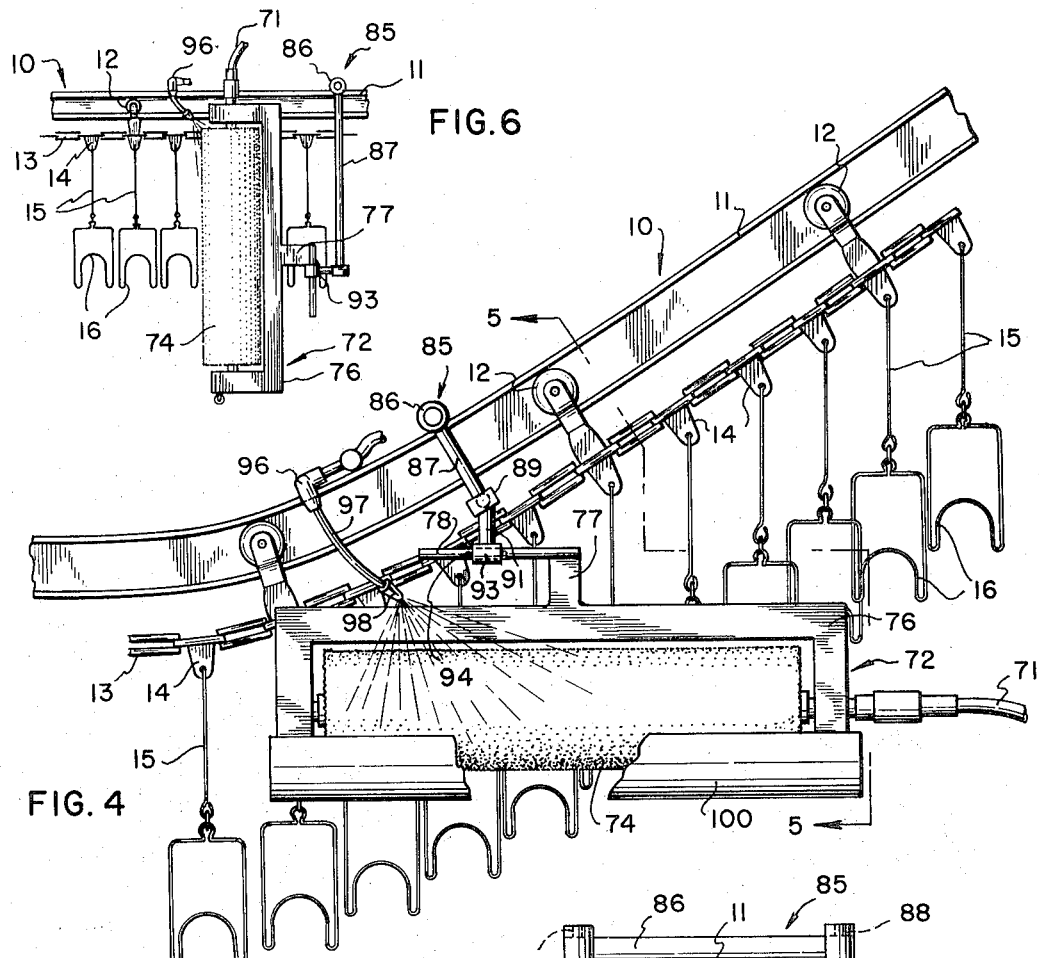
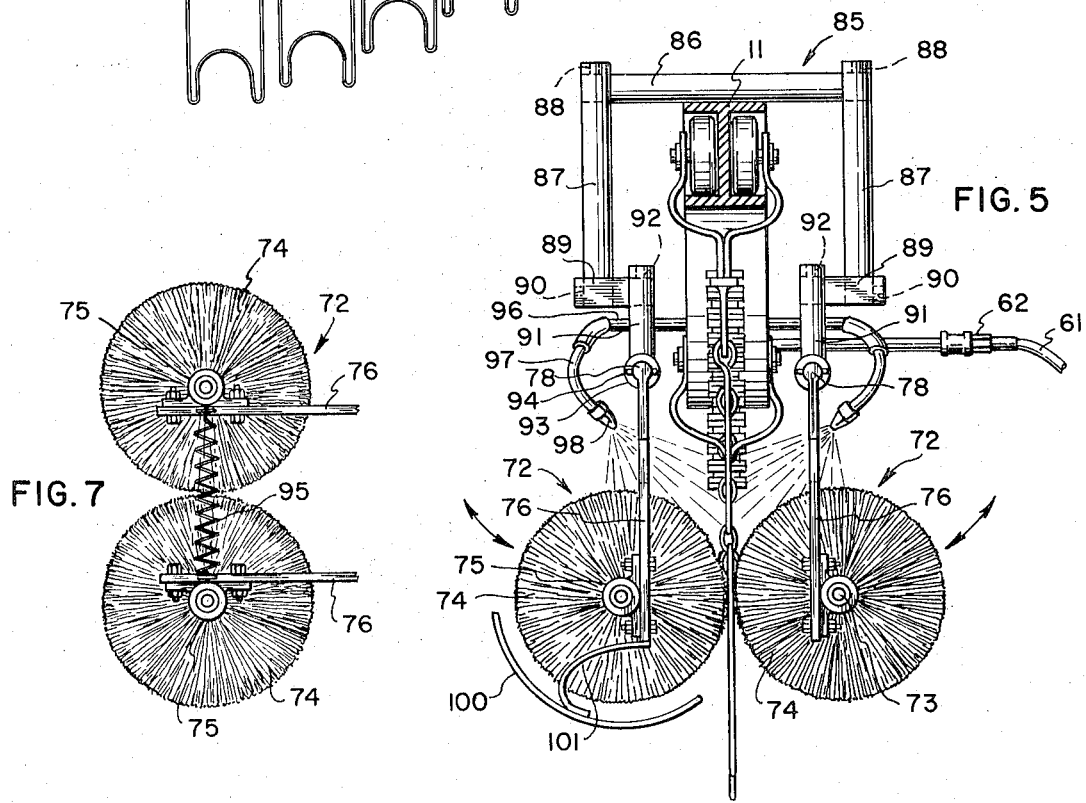

SHACKLE CLEANING DEVICE

BACKGROUND OF THE INVENTION

1. Field of the Invention

This invention relates generally to cleaning devices of various kinds and particularly to a portable and selectively mountable rotary brush apparatus for cleaning shackles and other elements suspended from overhead conveyors.

2. Description of the Prior Art

In industries such as meat processing, standard use is made of overhead conveyor systems. These rail or chain mounted conveyors are provided with multiple shackles or hooks from which carcases of animals or fowl are suspended during the various processing operations, such as skinning or defeathering, cleaning, and drying. During the processing operations, the shackles or other means used to support the animals from the conveyor become laden with blood, fat, and various other residue. In order to insure that the conveyors meet acceptable sanitary standards, these shackles or other supports must be cleaned at least daily and often after each processing cycle.

Heretofore, most processing plants have had to make use of hand scrubbing operations to keep this equipment cleaned. Hand cleaning, however, is not only time consuming, but is costly and often not thorough enough as some residual grease or fat deposits are frequently noticeable after such cleaning.

Automatic cleaning systems have been developed in an effort to provide a more adequate cleaning operation for the hook and shackle equipment used in meat processing and storing. Some systems require that the hooks or shackles which are to be cleaned be removed from the meat processing conveyor assembly and connected to a separate washing assembly for cleaning such as disclosed in U.S. Pat. No. 3,284,828 to Jennings et al. In systems such as this, extra time and handling expenses are encountered in preparing the equipment for cleaning and remounting the equipment after cleaning. Such systems are not suitable for use with shackles and hooks that are, for practical purposes, permanently attached or secured to a conveyor assembly.

Other cleaning systems have been provided which enable the washing unit to be attached directly to an overhead conveyor system. In systems such as this, problems are encountered when the shackle or hooks become entangled or crossed, as there is no means provided to allow any lateral displacement of the bars or rods which guide the shackles through the brushes. An example of this type of washer is U.S. Pat. No. 3,665,539 to Dillon which discloses the use of a pair of flexible bristled rotary cleaning brushes mounted in a housing attached to the overhead conveyor line. The need to position the apparatus along a horizontal portion of the conveyor requires that the size of the brushes be varied to compensate for various sizes and lengths of shackles or hooks encountered, as well as limit the choice of placement. Such washers are designed to clean only the hooks or shackles and not the supporting members, such as various chains and rods, by which the shackles and hooks are suspended below the conveyor rails.

Other examples of the prior art include U.S. Pat. Nos. 3,457,574 to Hirt; 2,891,268 to Cheadle; and 2,881,463 to Vogel.

SUMMARY OF THE INVENTION

This invention is an apparatus for cleaning the shackles, hooks, and other members suspended from an overhead rail conveyor. Such apparatus includes multiple cleaning brushes disposed at the ends of flexible drive shafts and therefore adapted to be utilized in various positions remote from a portable stand and motor assembly. Mounting brackets which can be adjusted both horizontally and vertically are provided for attaching a pair of cleaning brushes to the conveyor rails. The brushes are selectively mounted in tubular supports on the mounting brackets in such a manner as to allow the brushes, which are normally in peripheral contact, to be temporarily separated by the passage of entangled or bulky shackles and the like which are being cleaned. Cleaning fluid is discharged over the cleaning brushes by several liquid spray nozzles which may also extend from the portable stand.

It is an object of the invention to provide an apparatus for cleaning shackles, hooks, and other members suspended from an overhead rail conveyor which is both portable in nature and usable with existing overhead rail conveyor systems and at any convenient location in those systems.

Another object of the invention is to provide detachably mounted cleaning brushes disposed on each side of the shackles, hooks, and other members suspended from an overhead rail conveyor which permit entangled or crossed shackles, hooks, and the like to pass freely between the brushes.

BRIEF DESCRIPTION OF THE DRAWINGS

FIG. 1 is a side elevation illustrating one application of the invention.

FIG. 2 is an enlarged section on the line 2—2 of FIG. 1.

FIG. 3. is a top plan view thereof.

FIG. 4 is an enlarged side elevation of the rotary brushes in operation.

FIG. 5 is an enlarged section on the line 5—5 of FIG. 4.

FIG. 6 is a side elevation illustrating the brushes in vertical position.

FIG. 7 is an enlarged bottom plan view thereof.

DESCRIPTION OF THE PREFERRED EMBODIMENT

With continued reference to the drawings, a conventional overhead conveyor 10 is provided having an elevated support or guide rail 11 with a multiplicity of pairs of rollers 12 mounted on opposite sides thereof. Each pair of rollers is connected together by a yoke and such yokes are connected to a chain 13. The chain 13 has a plurality of outwardly extending lugs 14 which swingably support connecting rods 15 and each of such rods carries a shackle 16 which normally supports poultry or the like from the overhead conveyor 10.

As illustrated in FIG. 1, a shackle cleaning apparatus 20 is provided for cleaning the shackles 16 after the poultry has been removed, and such apparatus includes a base member 21 supported at one end by a pair of wheels 22 which are located at opposite sides of the base member and a third wheel or tandom wheels 23 located generally centrally of the other end of the base member. The tandom wheels 23 are mounted on a vertical shaft 24 which is pivotally connected to a tongue 25 carried by the base member 21. A handle 26 is attached to the shaft 24 and provides means for maneuvering the base member 21.

A vertically telescoping support column 27 is carried by the base member 21 and such column includes a sleeve 28 through which an extensible shaft 29 can be raised and lowered. Although the extensible shaft can be raised and lowered in any desired manner, as by hydraulic cylinders, hand cranks, and other devices, it is shown in this embodiment of the invention as being regulated by means of an electric hoist 30 mounted adjacent the top of the vertical sleeve 28. The hoist 30 includes a reel 31 on which a cable or chain 32 is mounted. The free end of the cable is connected to the extensible shaft 29 by means of a lug 33 which is welded or otherwise attached to the lower portion of the extensible shaft. The lug 33 extends through and is guided by an elongated slot (not shown) in the sleeve 28 which extends between a point adjacent the lower portion of such sleeve to a point adjacent the upper portion thereof.

A head 37 is mounted on the upper portion of the extensible shaft 29 and such head includes a support frame 38 connected by pivots 39 to a horizontal bar or plate 40 welded or otherwise attached to the top of the extensible shaft 29. The head 37 is adjustably supported by a hand crank 41 disposed centrally of the bottom portion of the frame 38. The hand crank 41 is threadedly connected to one end of a second horizontal bar or plate 42 which is attached at its other end to the midpoint of the first horizontal plate 40 and extends generally perpendicularly therefrom. The hand crank 41 serves both as a support for the head 37 and as a means for adjusting the angle at which the head is disposed relative to a horizontal plane.

A housing having a front wall 43, side walls 44 and 45, bottom wall 46 and rear wall 47 constructed of stainless steel or other suitable material is welded or otherwise attached to the support frame 38. A housing cover 48 is hingedly mounted on the side wall 44 and is selectively attached to the side wall 45 by latches 49. Such cover provides an access to the interior of the housing. Within the housing, a soap tank 50 having a cap 51 is located adjacent to the rear wall 47 and such tank is supplied with water, which is conventionally mixed with the soap within the tank through inlet 52.

As shown in FIG. 3, a power plant such as an electric motor 55 having a drive shaft 56 at each end is mounted within the head 37. A pump 57 is connected to one end of the shaft 56 by a coupling 58 and such pump is used to discharge the mixture of soap and water from the soap tank 50 through a pump inlet pipe 59 and a pump discharge pipe 60. The pump discharge pipe 60 extends through the front wall 43 of the housing and is connected to a flexible hose 61 in any desired manner, as by means of a quick disconnect coupling 62.

The opposite end of the drive shaft 56 is connected by a coupling 63 to a gear reduction 64 having an output drive shaft 65. The drive shaft 65 is connected by a coupling 66 to a shaft 67 which drives a series of meshing spur gears 68 mounted in a gear housing 69. Each of the spur gears 68 is attached to a drive shaft 70 which extends through the front wall 43 of the housing. Each of the drive shafts 70 is adapted to receive one end of a flexible drive shaft 71 and the opposite end of each flexible drive shaft is connected to a cleaning brush assembly 72. Since the spur gears 68 intermesh with each other, adjacent gears rotate their drive shafts 70 in opposite directions.

Each of the cleaning brush assemblies 72 includes a shaft 73 with relatively stiff bristles 74 disposed along the length thereof. The shaft 73 is supported adjacent opposite ends by bearings 75 carried by an inverted generally U-shaped frame 76. The U-shaped frame 76 has an upwardly extending hanger portion 77 with an outwardly extending hanger rod 78 having a plurality of holes 79 in which one or more locking pins are selectively received, as will be described later. Normally, when the device is not in use, the rods 78 are supported by sleeves 80 carried by brackets 81 extending downwardly from the frame 38 (FIGS. 1 and 2).

In order to selectively mount the cleaning brush assemblies 72 along various portions of the guide rail 11, a mounting bracket 85 is provided having a cross member 86 which is welded or otherwise attached to the top of the guide rail 11 (FIGS. 4 and 5). Adjacent each end of the cross member 86 are extension members 87 which are slidably and rotatably adjustable along the length of the cross member 86 and are fixed in adjusted position by set screws 88 thereby allowing the width of the mounting bracket to be altered to fit various sizes of conveyor rails. A selectively adjustable spacer bar 89 is secured by set screws 90 to each of the extension members 87 and extend relatively perpendicular therefrom. A hanger member 91 is selectively secured to each of the spacer bars 89 by set screws 92. Attached to the lower portion of each hanger member 91 is a tubular hanger rod support 93 which extends generally along each side of the conveyor rail. The tubular hanger rod supports 93 are adapted to receive the hanger rods 78 of the U-shaped frames 76 and thereby suspend the cleaning brush assemblies 72 on either side of the overhead conveyor in relative position for cleaning the shackles 16 and connecting rods 14 which are carried by the conveyor.

When the mounting brackets 85 are secured to an inclined portion of the conveyor, as in FIG. 4, the cleaning brushes are mounted generally horizontally. In this position, the brush assemblies 72 are freely rotatable about a generally horizontal axis in the tubular hanger supports 93, as shown in FIGS. 4 and 5, and are prevented from moving axially by locking pins 94 inserted through the holes 79 in the hanger rod 78 at each end of the tubular hanger supports 93. This arrangement allows the brush assemblies to swing apart and permit the passage of bulkier or entangled shackles.

If it is desired to mount the cleaning brush assemblies in a generally vertical position, as illustrated in FIGS. 6 and 7, along a relatively horizontal section of the conveyor, a spring member or other resilient member 95 is attached between the U-shaped frames 76 of the brush assemblies disposed on either side of the conveyor line. This arrangement allows the brush assemblies to be forced apart by bulkier or entangled shackles and provides the means for returning the cleaning brushes to their normal operating position.

The cleaning fluid which is pumped from the tank 50 into the flexible hose 61 is discharged into a header 96 mounted on the guide rail 11 and from such header the fluid is discharged through branch lines 97 located on both sides of the conveyor rail. A spray nozzle 98 which directs the cleaning fluid over the cleaning brushes is mounted on the end of each of the branch lines 97.

If desired, a curved metallic shield 100 may be secured by supports 101 to the lower portion and at both ends of the U-shaped frame 76 so as to be disposed generally below the bristles 74. The shields serve to guide and align the suspended shackles as they approach the cleaning brush assembly.

In use, the cleaning bursh mounting brackets 85 and the header 96 are prepositioned at any desired point along the conveyor rail and secured thereto. Next, the cleaning brush assemblies 72 are mounted on each side of the conveyor line by inserting the hanger rods 78 through the tubular supports 93 and held against axial movement by locking pins 94. The shackle cleaning unit head 37 can be raised or lowered by means of the electric hoist to any desirable heights, and the housing can be further adjusted relative to its angle to a horizontal plane by means of the hand crank 41.

The flexible shafts 71 enable the brush assemblies to be utilized at various positions and angles remote from the power source. Also, the mounting bracket 77 securely supports the brush assemblies relative to the shackles which are to be cleaned while permitting the brushes to swing apart when entangled or bulky hooks or shackles are encountered.

During the cleaning operation, soapy liquid from the soap tank 50 is sprayed over the cleaning brushes. The shackles 16 and shackle connecting rods 15 are pulled between adjacent rotary driven cleaning brushes which are rotating oppositely of each other so as to prevent any twisting action on the shackles and shackle supports. Should any entangled or bulky shackles be encountered, the cleaning brush assemblies are easily forced apart and after the obstruction has passed, the brush assemblies are returned to their normal operating position by either gravitational or spring means.

After the cleaning operation is completed, the brush assemblies are easily and conveniently removed from the mounting brackets 85 and placed in the sleeves 80 and the unit moved to any suitable storage area.

We claim:

1. Apparatus for cleaning support members suspended from a conveyor which is movably carried along a conveyor support structure comprising a bracket mounted on the conveyor support structure, said bracket having a conveyor support engaging member supported across the top of the conveyor support structure, extension means selectively secured to the conveyor support engaging member and extending downwardly on at least one side of the conveyor, said extension means having a width adjusting member selectively secured generally perpendicularly thereto, an angle adjusting member selectively secured generally perpendicular to said width adjusting member, said angle adjusting member having a tubular support attached thereto in which a selectively removable brush support frame is swingably mounted, a cleaning brush rotatably mounted on said frame, and means for driving said brush, whereby said brush engages and cleans the support members as the conveyor moves the support members past said brush.

2. Apparatus for cleaning support members suspended from a conveyor which is movably carried along a conveyor support structure comprising a bracket mounted on the conveyor support structure, a pair of brush support frames swingably carried by said bracket, said brush support frames being disposed along opposite sides of the conveyor, shield means mounted on each of said frames, an elongated cleaning brush rotatably mounted on each of said frames and being disposed generally between said shield means and the conveyor support structure, said shield means extending generally along the elongated length of said brushes, means for driving said cleaning brushes, whereby said shield means guide and align the support members between said cleaning brushes as the conveyor moves the support members relative to said apparatus.

3. The cleaning apparatus of claim 2 in which said means for driving said cleaning brushes includes a flexible drive shaft, said flexible drive shaft extending between each of said brushes and a remote driving mechanism.

4. A portable apparatus for cleaning support members suspended from a conveyor which is movably carried along a conveyor support structure comprising a base, ground-engaging wheel means supporting said base, a support column mounted on said base and extending generally upwardly therefrom, a head mounted on the upper end of said column, said head including a power plant, a plurality of output shafts driven by said power plant, brush means connected to each of said output shafts, and means for selectively swingably mounting said brush means on the conveyor support structure in a position to engage and clean the support members.

5. The structure of claim 4 in which at least a portion of each of said output shafts is flexible.

6. The structure of claim 4 in which said head includes means providing a supply of cleaning fluid, conduit means connected to said fluid supply, said conduit means selectively discharging cleaning fluid onto each of said brush means.

7. The structure of claim 4 in which said head is swingably mounted on said column, and means for adjusting the angular relationship between said head and said column.

8. The structure of claim 4 in which said brush means includes a generally U-shaped frame, a brush having a shaft rotatably mounted on said frame and being driven by one of said output shafts, and a hanger portion extending outwardly from said frame.

* * * * *